United States Patent [19]

Pimpinella

[11] Patent Number: 5,461,693
[45] Date of Patent: Oct. 24, 1995

[54] OPTICAL FIBER DISTRIBUTION FRAME WITH FIBER TESTING

[75] Inventor: Richard J. Pimpinella, Hampton, N.J.

[73] Assignee: AT&T IPM Corp., Coral Gables, Fla.

[21] Appl. No.: 275,068

[22] Filed: Jul. 14, 1994

[51] Int. Cl.[6] .................................................. G02B 6/36
[52] U.S. Cl. ........................ 385/135; 385/134; 385/31; 359/115; 359/124
[58] Field of Search ................................... 385/134, 135, 385/14, 15, 24, 31, 39; 359/115, 114, 127, 143, 173

[56] References Cited

U.S. PATENT DOCUMENTS

| | | | |
|---|---|---|---|
| 4,630,886 | 12/1986 | Lauriello et al. | 385/135 X |
| 4,861,134 | 8/1989 | Alameel et al. | 385/135 |
| 5,029,958 | 7/1991 | Hodge et al. | 385/135 |
| 5,090,792 | 2/1992 | Koht et al. | 385/32 |
| 5,214,444 | 5/1993 | Kerr et al. | 346/76 L |
| 5,228,105 | 7/1993 | Glista | 385/89 |
| 5,261,024 | 11/1993 | Allen et al. | 385/135 |
| 5,283,851 | 2/1994 | Vergnolle | 385/134 |
| 5,285,305 | 2/1994 | Cohen et al. | 359/110 |

*Primary Examiner*—Brian Healy
*Attorney, Agent, or Firm*—Lester H. Birnbaum

[57] ABSTRACT

Disclosed is an optical fiber distribution frame which provides means for testing the patch connections. Optoelectronic circuits are inserted into each module and are optically connected to the incoming optical fiber cable. The circuit includes a light source for launching a test signal into the patch fiber, a detector for monitoring a test signal from the patch fiber, and a microprocessor for controlling the launching and for monitoring the received signals.

16 Claims, 4 Drawing Sheets

CROSS CONNECT

OPTICAL POWER

OPTICAL FIBER DISTRIBUTION FRAME WITH FIBER TESTING

BACKGROUND OF THE INVENTION

This invention relates to optical fiber distribution flames.

Optical fiber distribution frames, such as AT&T's lightguide cross-connect (LGX®) distribution frame, serve the function of coupling incoming fiber optic cables to customer equipment. The frame typically includes a multiplicity of shelves, each shelf including a single or plurality of modules where the optical connections are made to the fibers of the incoming cable. Cross-connect jumper cables (also known as patch cords) are applied in the front of the apparatus between the modules which are to be optically connected (see, e.g., U.S. Pat. No. 4,630,886 issued to Laurielip et at.).

One of the problems which exists in typical frames is the high density of optical connections, typically 72–144 connections per shelf. The great number of cross-connections makes it very difficult to be able to determine if both ends of a patch connection are properly connected.

It is desirable, therefore, to test the connections of the jumper cables as well as to test for any fiber breaks. It is known to launch test signals in order to determine the condition of fibers in an optical fiber transmission system (see, e.g., U.S. Pat. No. 5,285,305 issued to Cohen et al.). However, in present frames, it is not generally practical or cost effective to test patch cords.

SUMMARY OF THE INVENTION

The invention in one aspect is an optical fiber distribution frame having a plurality of shelves, each shelf including a plurality of modules for optically connecting optical fibers from a cable with optical fiber jumper cables. At least one module includes means for launching a test signal through an optical fiber jumper cable to another module connected thereto by said jumper cable, and the said another module includes means for receiving and monitoring a test signal launched by said one module.

BRIEF DESCRIPTION OF THE DRAWING

These and other features of the invention are delineated in detail in the following description. In the drawing.

DETAILED DESCRIPTION

Figure 1:
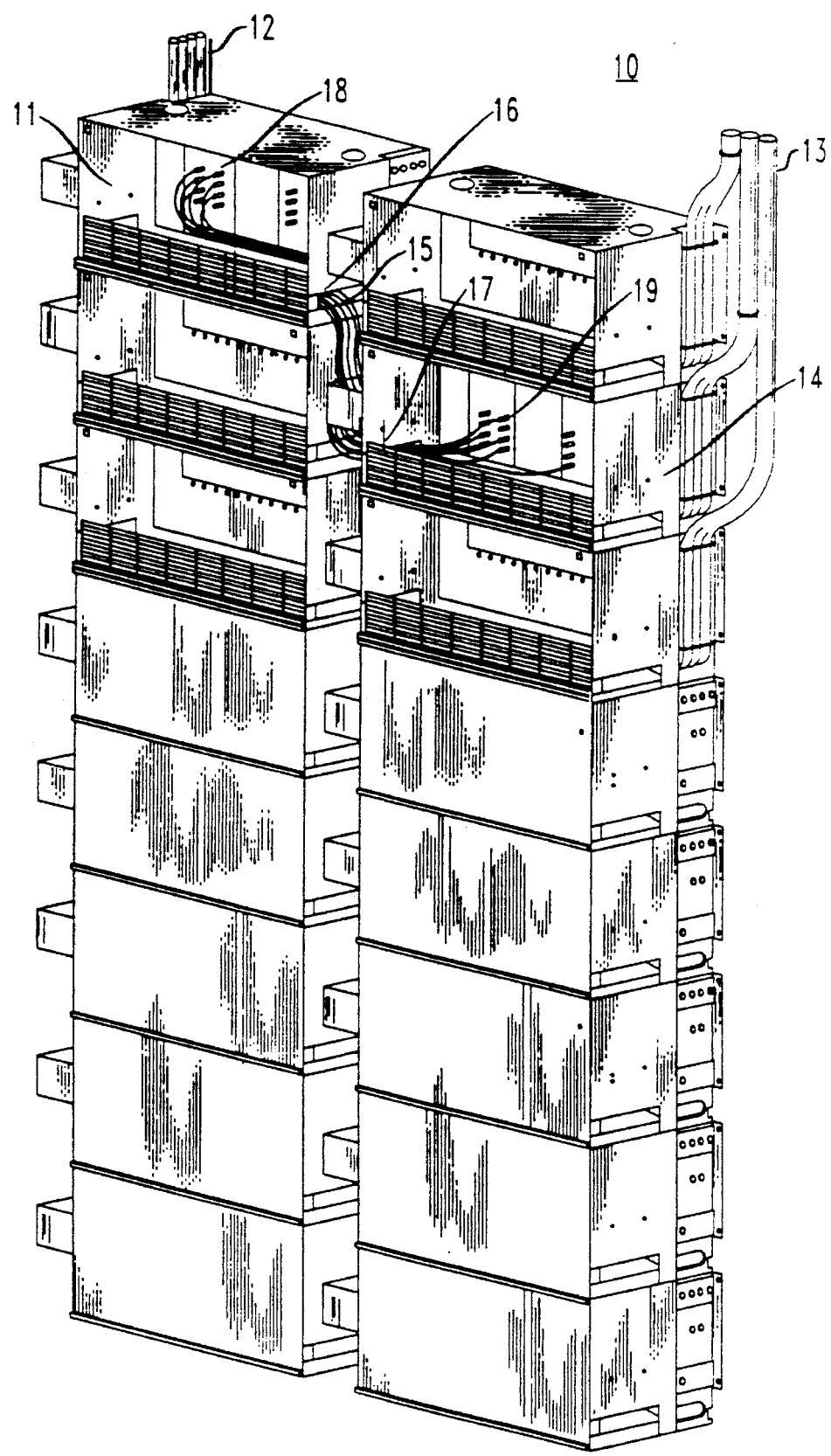
FIG. 1 is a perspective view of a fiber distribution frame including the invention in accordance with one embodiment.

FIG. 1 illustrates a typical fiber distribution frame 10 which may utilize the invention. The frame includes a plurality of shelves, e.g., 11 and 14, arranged in two columns in this example. Each shelf includes a plurality of modules, e.g., 18 and 19, where optical fibers from a trunk cable 12, or transmission cable 13, are connected with fiber jumper cables, e.g., 15, for purposes of cross-connection between the cables. Typically, the trunk cable 12 or transmission cable 13 is brought into the frame at the back and fibers from the cable are introduced into each module through an aperture which can be located at the front or rear of the shelves. In this example, all fiber connections are made in the front of the module.

Figure 2:
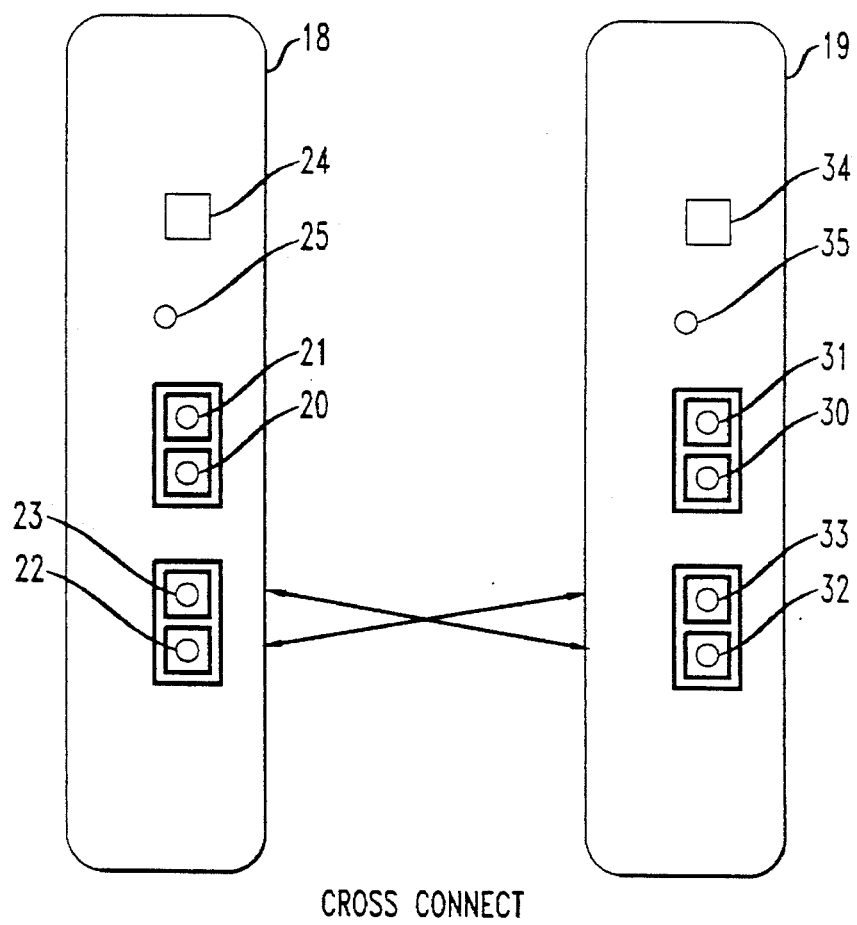
FIG. 2 is a more detailed view of two modules which are part of the fiber distribution frame of FIG. 1.

For purposes of illustration, the doors of the top three shelves in each column have been removed. Again, for purposes of illustration, a set of jumper cables, e.g., 15, are shown connected from shelf 11 (e.g., module 18) through aperture 16 to shelf 14 (e.g., module 19) through aperture 17. Of course, any fiber from the trunk cable 12 can be connected with any fiber from the transmission cable 13, through an appropriate jumper cable connection. In this example, each of the shelves in the left-hand column has access to the trunk cable and each of the shelves in the right-hand column has access to the transmission cable, but other arrangements are possible FIG. 2 gives more detail in the two modules, 18 and 19, which are to be optically connected by the jumper cable 15. Each panel includes a pair of jacks, 20, 21 and 30, 31, which receive standard optical connectors attached to a pair of fibers (not shown) from the trunk cable 12 in the case of module 18 or transmission cable 13 in the case of module 19. One of the jacks (20, 30) is adapted for receiving optical signals from a respective cable, and the other jack (21, 31) is adapted for transmitting optical signals to its respective cable. Each module also includes a pair of jacks 22, 23 and 32, 33, for optically connecting the two modules. As illustrated by the arrows, jack 22 of module 18 will be optically coupled to jack 33 of module 19, while jack 23 of module 18 will be optically coupled to jack 32 of module 19. Thus, plugging a jumper cable into the appropriate jacks of modules 18 and 19 will provide the necessary cross-connection between a pair of fibers from the central office (cable 12) and a pair of fibers coupled to a customer's equipment (cable 13).

Once the optical connection is made between the appropriate modules (18 and 19) it is desirable to ensure that the optical connection has been made correctly. It is also desirable to check for fiber breaks at periodic intervals.

Figure 3:
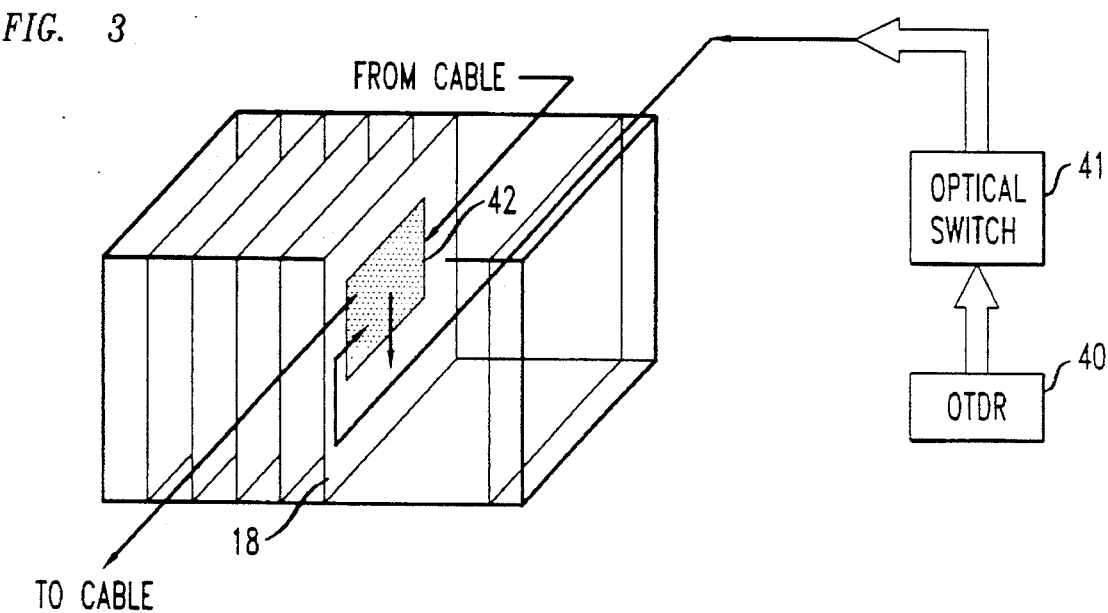
FIG. 3 is a schematic block diagram illustrating optical connections to and from a module in accordance with an embodiment of the invention.

FIG. 3 illustrates the optical connections to each module which permit testing of the fibers in the cables (12 or 13) connected thereto. A source 40 provides test signals for optical time domain reflectometry (OTDR). This source is coupled to a series of optical switches, 41, which distribute the signal to the modules. Typically, there will be a switch for each bay and a switch for each shelf of the frame 10. The test signals are coupled to an electro-optical circuit 42 in each module (e.g., 18) which circuit, in turn, couples the signal to the send and/or receive fibers coupled to that module from the cable (e.g., 12).

Figure 4:
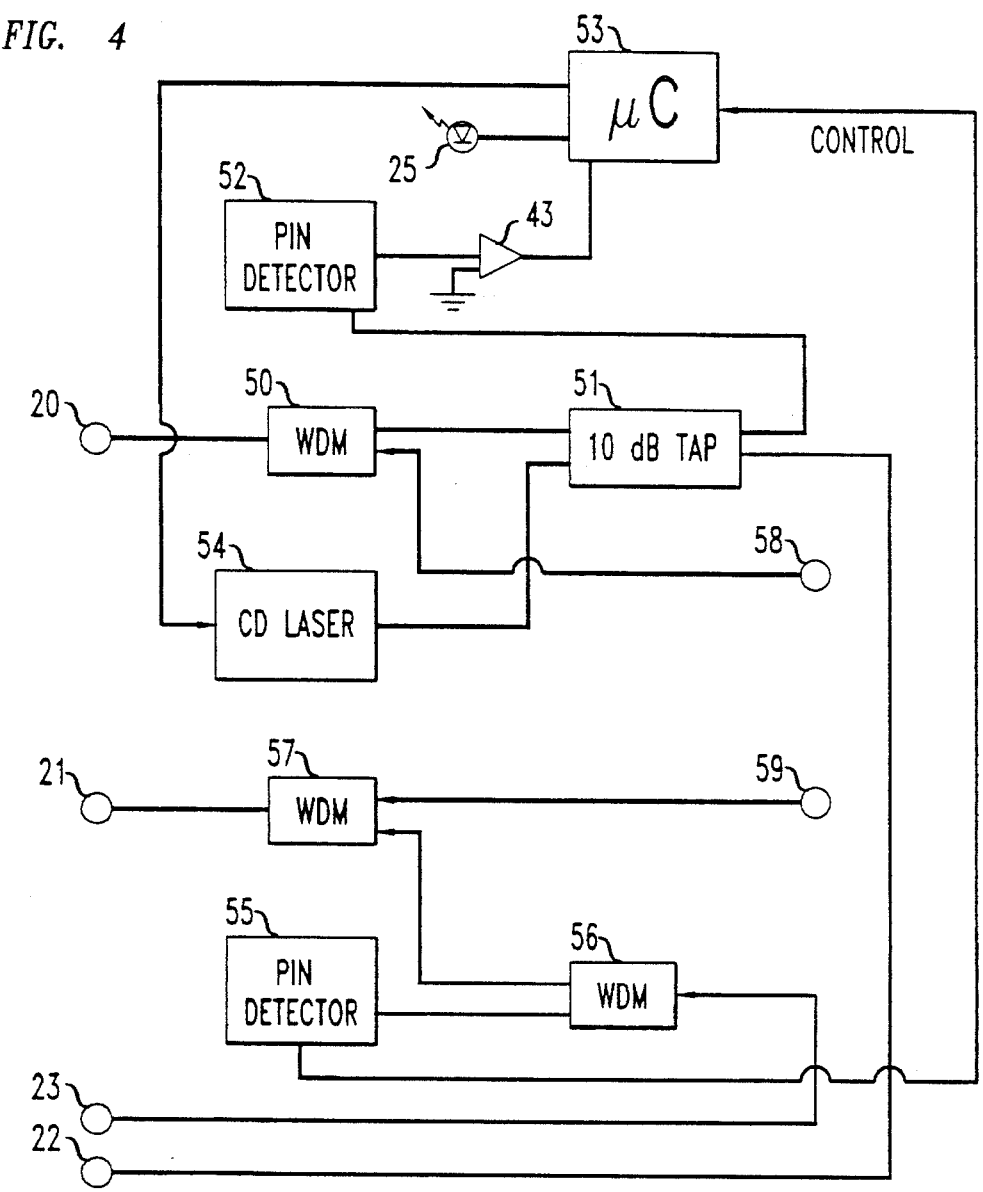
FIG. 4 is a schematic block diagram of a portion of the circuitry of a module in accordance with an embodiment of the invention.

FIG. 4 illustrates the circuit 42 which not only allows testing of the cable fibers, but also allows testing of the jumper cables between panels. A first wavelength division multiplexer (WDM) 50 has an input coupled to jack 20 and an output coupled to a tap 51. One output of the tap is coupled to the jack 22, while the other output of the tap is coupled to a light detector 52 such as a PIN photodiode. The electrical output of the photodiode is coupled to a microprocessor 53 through an amplifier 43. One port of the microprocessor is coupled to a light emitting device (LED) 25, which is mounted on the front of the panel (see FIG. 2).

Another port of the microprocessor is coupled to another light emitting device 54, such as a compact disc (CD) laser, whose optical output is coupled to the tap 51. Another port of the microprocessor 53 is coupled to the electrical output of another PIN photodiode 55. The optical input of the PIN photodiode 55 is coupled to an output of a wavelength division multiplexer (WDM) 56, whose input is coupled to jack 23. Another output of WDM 56 is coupled to an input of another WDM 57, whose output is coupled to jack 21. Inputs of WDMs 50 and 57 are also coupled to the optical switches (41 of FIG. 3) through jacks 58 and 59, respectively.

Figure 6:
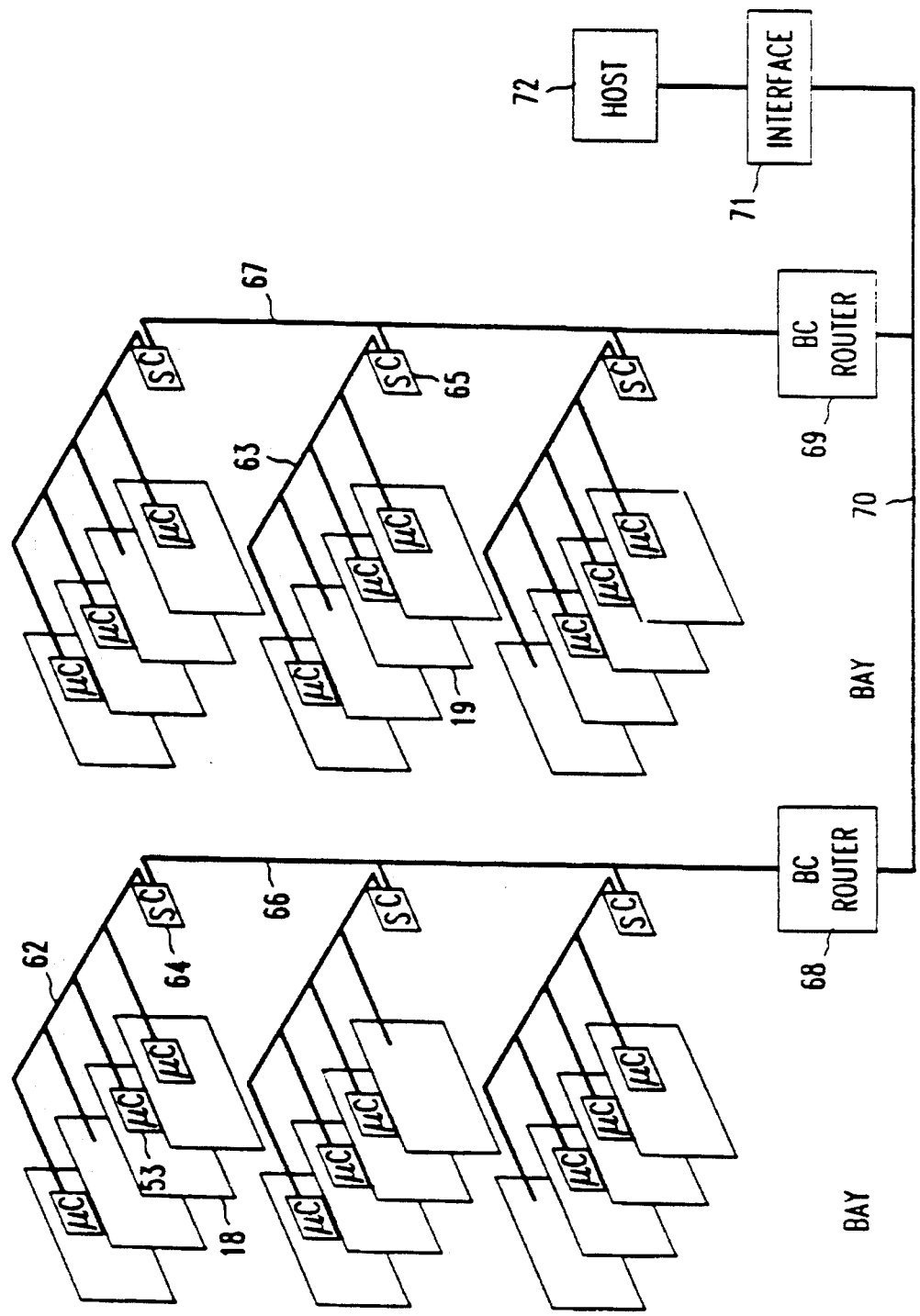
FIG. 6 is a schematic diagram showing the electrical connection of the modules in a frame.

FIG. 6 illustrates that each module, e.g., 18 and 19, is electrically coupled to a bus, e.g., 62 and 63, on a backplane, which electrically couples all or a selected number of modules in a shelf to a shelf controller (microprocessor), e.g., 64 and 65. The shelf controllers in each bay of the frame are electrically coupled by means of busses, 66 and 67, to corresponding bay controller (BC) routers, 68 and 69, which, in turn, are coupled to a local area network bus 70 such as an Echelon bus. The bay controllers are desirable, though not necessary, since they permit a greater number of nodes to operate on the bus. The network bus 70 is coupled to a host computer 72 through a standard interface 71. The host computer 72 includes a data base which contains all the appropriate optical connections between modules (e.g., 18 and 19).

In operation, the module 18 receives optical signals from the fiber in cable 12 which is coupled to jack 20. Typically, the information signals are transmitted at a frequency of 1310 nm and test signals are transmitted at 1550 nm. These frequencies can be altered according to specific needs. Wavelength division multiplexer 50 separates the information and reflected test signals and transmits the information signals to tap 51. Tap 51 transmits most of the signal (typically 90–99 percent) to jack 22 for coupling to another module (e.g., 19) in the frame.

Figure 5:
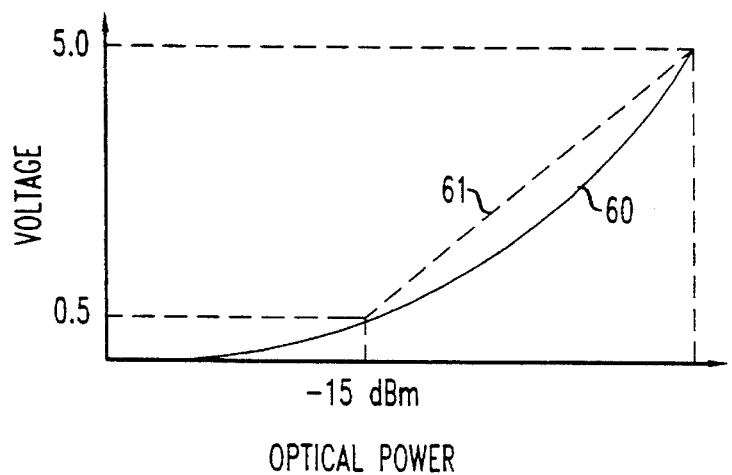
FIG. 5 is a graph of photodetector voltage as a function of optical power for a module in accordance with the same embodiment of the invention.

A small portion of the information signal, typically 0.1–0.5 dB, is coupled to the PIN detector 52, which transforms the optical signal into an electrical signal according to curve 60 shown in FIG. 5. The amplifier 43 receives the electrical signal and linearizes it according to curve 61 of FIG. 5 in order to permit the microprocessor 53 to read the information. The microprocessor continuously samples the power of the information signal and notifies the host computer 72 if there is a disruption or a fluctuation in the power level. It also lights LED 25 in the event of a disruption.

In response to a disruption of power, the host computer 72 can launch the test signals from the OTDR source (40 of FIG. 3) automatically into either terminal 58 or 59 which are coupled to wavelength division multiplexers 50 or 57 in order to direct the signals onto jacks 20 or 21 to the fibers in the cable 12. The reflections of the test signal transmitted on jack 20 and 21 are received by corresponding wavelength division multiplexers 50 and 57, and are monitored by a receiver (not shown) in the OTDR source 40 according to standard optical time domain reflectometry principles.

In order to test the optical fiber jumper cable connected between the modules (e.g., 18 and 19), the microprocessor 53 sends a signal to the laser 54 which launches an optical test signal to the tap 51. The signal from the laser can be, typically, 780 nm. From the tap, the signal is optically coupled to the jack 22 where it is sent on to the module to which it is connected (e.g., 19) through the jumper cable. At the same time, the microprocessor 53 will signal the host processor 72 that it wishes to test the jumper cable between its module (18) and the module (19) to which it is connected. The host processor will check its data base and signal the other module to launch a test signal from its CD laser so that a test signal is received by module 18 on jack 23.

The received optical test signal is then separated from the information signal by WDM 56. The information signal is sent to WDM 57 so that, together with the OTDR signal from terminal 59, it is transmitted from jack 21 to the cable. The test signal from the other module (19) is coupled to the PIN photodetector 55 where it is converted to an electrical signal. The photodetector 55 sends a control bit (0,1) to the microprocessor 53 to indicate whether or not the test signal is received. If no signal is received, the microprocessor 53 will know that the connection is faulty, or that the jumper cable was coupled to the wrong module.

Various modifications of the invention will become apparent to those skilled in the art. For example, an additional wavelength division multiplexer can be used in place of the tap 51 in order to launch the test signal, although use of the tap for this function is preferred since it already exists to monitor the signal on jack 20.

Also, while duplex patch cords are discussed in the illustrative embodiment, the invention is also applicable where a single fiber is used to patch the modules. In such case only a single jack (e.g., 22 or 23) is needed on each module for patching. Optical transmission on such patch cords can be bidirectional or unidirectional. In the case of unidirectional transmission, each module could include a means for launching (e.g., laser 54) or receiving (e.g., detector 55) a test signal, but does not necessarily include both means.

All such variations which basically rely on the teachings through which the invention has advanced the art are properly considered within the scope of the invention.

I claim:

1. An optical fiber distribution frame comprising:
   a plurality of shelves;
   and a plurality of modules mounted within the shelves for optically connecting optical fibers from a cable to optical fiber jumper cables, at least one of said modules including means for receiving an information signal of a first wavelength and for launching the information signal through an optical fiber jumper cable to another module connected thereto, and means for launching a test signal of a second wavelength through the same jumper cable to said another module connected thereto, said another module including means for receiving and monitoring the test signal launched by said one module.

2. Apparatus according to claim 1 wherein both modules include both means for launching and means for receiving a test signal through the jumper cable.

3. Apparatus according to claim 1 further comprising means for electrically connecting each module to a computer with a data base of which modules should be connected by a jumper cable, and means for signaling the computer that a test is being made with the module to which it is connected.

4. Apparatus according to claim 1 further comprising means for launching a second test signal through an optical fiber in the cable and for receiving and monitoring the reflection of said signal.

5. Apparatus according to claim 4 wherein said means for launching and receiving comprises a wavelength division multiplexer.

6. Apparatus according to claim 4 further comprising means for coupling each module to a source of the second test signal which is outside the frame.

7. Apparatus according to claim 1 wherein the means for launching the test signal comprises a CD laser.

8. Apparatus according to claim 1 wherein the means for launching the test signal comprises a light emitting device optically coupled to one port of an optical tap, another port of said tap being optically connected to the jumper cable.

9. Apparatus according to claim 1 wherein the means for receiving and monitoring comprises a photodetector with a microprocessor electrically coupled thereto.

10. A module for optically connecting optical fibers in a cable to optical fibers in a jumper cable comprising:
   at least one jack adapted for optical connection to the jumper cable;
   means for coupling an information signal of a first wavelength into the jumper cable;
   means including a light emitting device optically coupled to said jack for launching a test signal of a second wavelength into the jumper cable; and
   a microprocessor electrically connected to said device for controlling the launching of the test signal.

11. Apparatus according to claim 10 wherein the light emitting device is a CD laser.

12. Apparatus according to claim 10 wherein the means further comprises an optical tap, the light emitting device being optically coupled to one port of the tap, another port of said tap being optically connected to said jack.

13. Apparatus according to claim 10 further comprising a photodetector optically coupled to another jack adapted for optical connection to the jumper cable.

14. Apparatus according to claim 13 wherein the photodetector is coupled to said another jack through a wavelength division multiplexer.

15. Apparatus according to claim 10 further comprising means for launching a second test signal through at least one optical fiber in the cable and for detecting reflections of said second test signal.

16. Apparatus according to claim 15 wherein the means for launching the second test signal comprises a wavelength division multiplexer.

* * * * *